US011488045B2

(12) United States Patent
Calmon et al.

(10) Patent No.: US 11,488,045 B2
(45) Date of Patent: Nov. 1, 2022

(54) ARTIFICIAL INTELLIGENCE TECHNIQUES FOR PREDICTION OF DATA PROTECTION OPERATION DURATION

(71) Applicant: EMC IP Holding Company LLC, Hopkinton, MA (US)

(72) Inventors: Tiago Salviano Calmon, Rio de Janeiro (BR); Eduardo Vera Sousa, Niterói (BR); Hugo de Oliveira Barbalho, Rio de Janeiro (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 323 days.

(21) Appl. No.: 16/846,818

(22) Filed: Apr. 13, 2020

(65) Prior Publication Data

US 2021/0319348 A1    Oct. 14, 2021

(51) Int. Cl.
  *G06N 7/00* (2006.01)
  *G06F 21/62* (2013.01)
  *G06N 20/00* (2019.01)

(52) U.S. Cl.
  CPC ......... *G06N 7/005* (2013.01); *G06F 21/6218* (2013.01); *G06N 20/00* (2019.01)

(58) Field of Classification Search
  CPC ..... G06N 7/005; G06N 20/00; G06F 21/6218
  See application file for complete search history.

(56) References Cited

PUBLICATIONS

Xia et al., "A Comprehensive Study of the Past, Present, and Future of Data Deduplication", Proceedings of the IEEE, 2016, pp. 1-30 (Year: 2016).*

Reinsel et al., "IDC Data Age 2025," Apr. 2017. [Online]. Available: https://assets.ey.com/content/dam/ey-sites/ey-com/en_gl/topics/workforce/Seagate-WP-DataAge2025-March-2017pdf. [Accessed Oct. 3, 2019].
Market Watch, "Market Watch," Jan. 16, 2019. [Online]. Available: https://www.marketwatch.com/press-release/data-protection-market-is-anticipated-to-grow-us-120-billion-by-2023-2019-01-16. [Accessed Oct. 3, 2019].
W. contributors, "Error Function," Wikipedia, The Free Encyclopedia, Nov. 16, 2019. [Online]. Available: https://en.wikipedia.org/w/index.php?title=Error_function&oldid=926484576. [Accessed Nov. 19, 2019].
Xia et al., "A Comprehensive Study of the Past, Present, and Future of Data Deduplication," in Proceedings of the IEEE, 2016.

* cited by examiner

*Primary Examiner* — Hee K Song
(74) *Attorney, Agent, or Firm* — Ryan, Mason & Lewis, LLP

(57) ABSTRACT

Techniques are provided for predicting a time to complete a data protection operation. One method comprises obtaining metadata for (i) a given data protection appliance, and/or (ii) a cluster of similar data protection appliances comprising the given data protection appliance; evaluating first level features using the obtained metadata; evaluating a second level feature using some of the evaluated first level features; and processing one or more of the first level features, and the second level feature, using a model that provides a predicted time to complete a data protection operation with respect to data of a protected device associated with the given data protection appliance. The predicted time may comprise a tolerance based on a robustness factor. The predicted time may be based on a number of protected devices that are concurrently undergoing a data protection operation with the protected device for one or more time intervals.

20 Claims, 9 Drawing Sheets

FIRST LEVEL PERFORMANCE FEATURES 400

| FEATURE 410 | DESCRIPTION 420 |
|---|---|
| ELAPSED TIME | AMOUNT OF TIME TO COMPLETE OPERATION AFTER START TIME |
| BYTES SCANNED | SIZE OF DATA TO RUN OPERATION |
| BYTES SENT | SIZE OF DATA AFTER DEDUPLICATION |
| SCHEDULED TIME | TIME THAT OPERATION IS SET TO START |
| START TIME | ACTUAL TIME OPERATION STARTS |
| OPERATION TYPE | BACKUP OR RESTORE |

FIG. 4

DATA PROTECTION TABLE 500

| | 1 | 2 | 3 | 4 | 5 | 6 | 7 |
|---|---|---|---|---|---|---|---|
| $D_1$ | o | o | o | o | | | |
| $D_2$ | o | o | o | | | | |
| $D_3$ | | | | | | | |
| $D_4$ | | | | o | o | | |

PROTECTED DEVICES 510

TIME PERIOD 510

AGGREGATION TABLE 550

| 1 | 2 | 3 | 4 | 5 | 6 | 7 |
|---|---|---|---|---|---|---|
| 2 | 2 | 2 | 2 | 1 | 0 | 0 |

CONCURRENT OPERATIONS PER TIME PERIOD 560

ARTIFICIAL INTELLIGENCE TECHNIQUES FOR PREDICTION OF DATA PROTECTION OPERATION DURATION

FIELD

The field relates generally to information processing techniques, and more particularly, to the protection of data in information processing systems.

BACKGROUND

Many enterprises and other users need to protect important data. Using an infrastructure to protect such important data while respecting applicable Service Level Agreements (SLAs), however, poses a number of challenges. One challenge lies in the data protection environment, where users often need to cope with a maximum amount of time that can be lost due to a disruption (e.g., a data loss).

A need exists for techniques for predicting a time to perform data protection operations.

SUMMARY

In one embodiment, a method comprises obtaining metadata for at least one of: (i) a given data protection appliance, and (ii) a cluster of similar data protection appliances comprising the given data protection appliance, based at least in part on one or more similarity criteria; evaluating a plurality of first level features using the obtained metadata; evaluating at least one second level feature using at least some of the evaluated first level features; and processing (i) one or more of the first level features, and (ii) the at least one second level feature, using at least one model that provides a predicted time to complete a data protection operation with respect to data of a protected device associated with the given data protection appliance.

In some embodiments, the at least one second level feature comprises one or more of: (i) a previous data protection speed feature based at least in part on an elapsed time and an amount of data protected in one or more prior data protection operations for the protected device associated with the given data protection appliance; and (ii) a deduplication ratio feature based at least in part on an amount of data protected in one or more prior data protection operations after a deduplication operation relative to an amount of data included in the one or more prior data protection operations before the deduplication operation for the protected device associated with the given data protection appliance.

In one or more embodiments, the predicted time to complete the data protection operation comprises a tolerance based at least in part on a robustness factor. In addition, the predicted time to complete the data protection operation may be based at least in part on a number of protected devices associated with the given data protection appliance that are concurrently undergoing a data protection operation with the protected device for one or more time intervals.

Other illustrative embodiments include, without limitation, apparatus, systems, methods and computer program products comprising processor-readable storage media.

BRIEF DESCRIPTION OF THE DRAWINGS

FIG. 4 is a sample table illustrating exemplary first level performance features, according to one or more embodiments of the disclosure;

FIG. 5 illustrates exemplary tables for computing a number of concurrent data protection operations, according to at least one embodiment of the disclosure;

DETAILED DESCRIPTION

Figure 1:
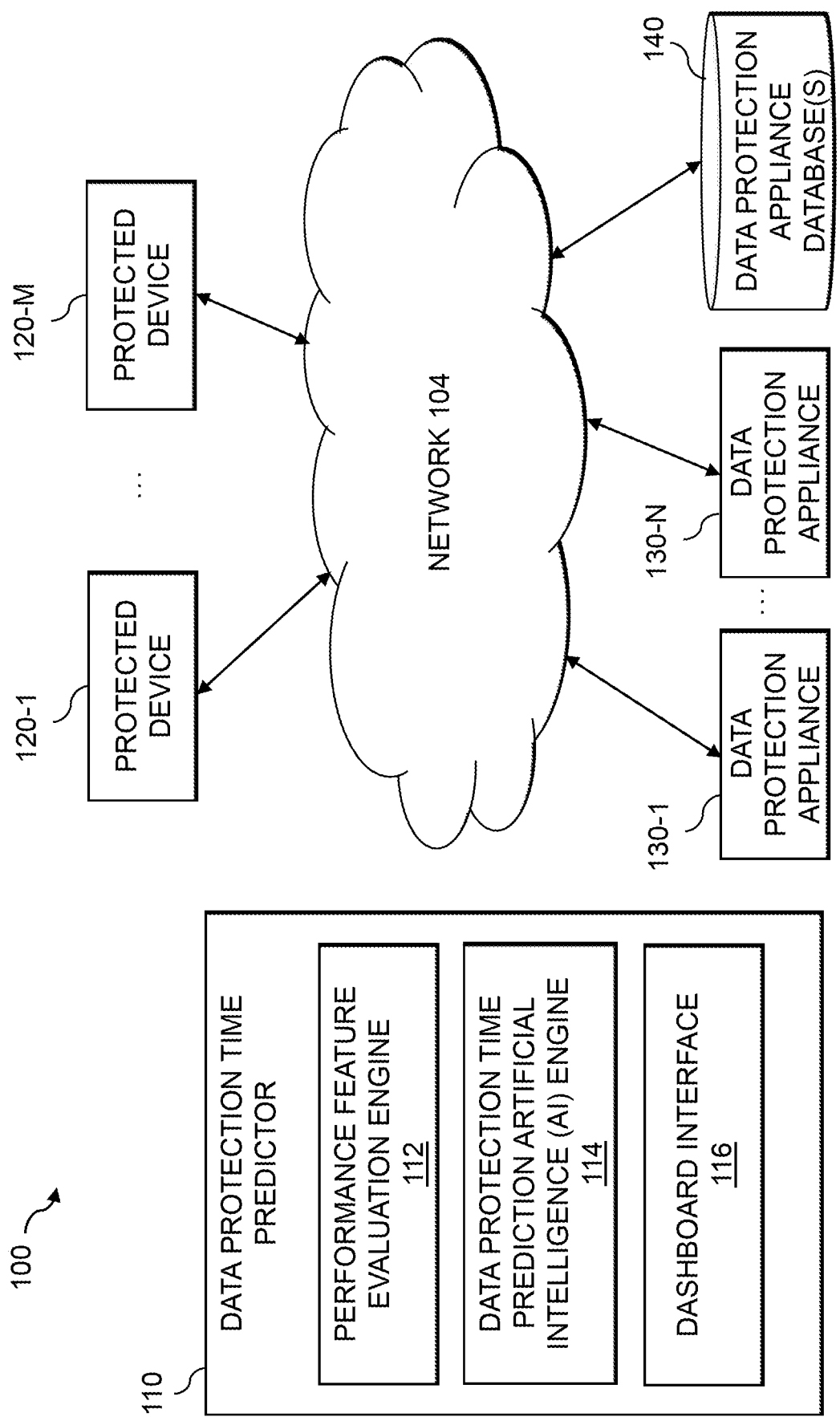
FIG. 1 illustrates an exemplary data protection environment, according to one embodiment of the disclosure.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for predicting a time to complete a data protection operation.

In many data protection schemas, data backup and recovery help to enable high resilience and availability of data and, thus, protect companies (and other users) from various disruptions caused by data loss, for example. In addition, government-mandated regulatory compliance may demand that certain companies (and other users) reliably store some of their data for certain periods of time. Thus, it is often a common practice to rely on data protection solutions to protect critical data for companies. Companies in the United States, for example, are expected to spend more than $120 billion for data protection solutions by 2023, making the data protection market a highly competitive marketplace for competitors with significant growth potential.

Artificial intelligence (AI) techniques (and associated data) are increasingly pervasive and create competitive advantages for companies that have the most valuable data. It is not surprising that companies do not want to lose their data, and thus often rely on data protection solutions to store and protect large amounts of data (that can often be stored in different formats, such as file, block and object formats).

In a data protection environment, there are often two main service level metrics that impact the data protection pipeline, namely, Recovery Point Objective (RPO) and Recovery Time Objective (RTO). RPO is a measure of the maximum tolerable amount of data that can be lost due to a disruption (e.g., due to a data loss) and can generally indicate how much time can occur between a most recent data backup and a disruption without causing serious damage to a business. Thus, for example, if the RPO of a particular data item is eight hours, the data protection solutions must ensure that copies are available in a period less than or equal to the specified RPO amount.

RTO is a measure indicating how quickly you need to recover the infrastructure and services following a disruption in order to maintain business continuity (e.g., the amount of time that can be lost until data is recovered from a disruption). Thus, if the RTO for a given data item is one hour, the data protection solutions must ensure that a recovery event takes at most one hour to allow the business to operate as usual again.

To cope with small RTOs, for example, companies often rely on hardware and software innovations. Multiple solutions have been proposed or suggested to cope with increasingly lower RTOs. To cope with RPOs, one approach is to schedule backup operations with a periodicity that respects the given SLAs.

One common approach schedules data protection operations separately for each (hoping that the infrastructure can handle an increasingly complex backup environment). The increasing complexity of a vital environment tends to be on the mind of just a very small number of Information Technology professionals within an organization, or kept in isolation (e.g., siloed) within different areas of a large company.

The above-mentioned characteristics are a growing problem and will become even more apparent as enterprise environments grow. If each protected device manager (or even a global data protection manager) schedules backup operations per protected device, a number of disruptions can occur. For example, the maximum number of streams in a data protection appliance might be small compared to the number of scheduled backup operations for the same time.

When scheduling is done in an ad-hoc manner and on a per-protected device basis, some data protection operations might need to wait a significant amount of time after the scheduled time before the data protection operation actually starts (thereby potentially making RPO compliance even more error prone).

Thus, there is often a need for an automatic process to determine a data protection schedule based on SLAs. In at least some embodiments, any such data protection schedule determination process must ensure that data protection operations occur within applicable service levels, and, more specifically, the RPO (or other SLA) for each protected device. The data protection schedule determination process may also need to perform as few operations as possible in order to still be able to handle new data protection operations, when they become necessary.

In one or more embodiments, techniques are provided for predicting a data protection time. In some embodiments, the data protection time is predicted in datasets that are not machine learning-friendly (e.g., datasets containing data protection metadata that were not captured for this purpose, where the needed features may be hidden in the data).

In the data protection environment, knowing in advance the amount of time that a data protection operation will need to finish can be important for different strategic decisions. Generally, as used herein, a data protection operation comprises a backup operation and/or a restore operation. Given the disclosed techniques for predicting a time to complete a data protection operation, customers are able to better determine the size of the data protection environment that they need, and suppliers are able to design data protection appliances that can work with current and future workloads. For example, if one needs to schedule a set of data protection requests, having a prediction of data protection time can be used to determine a schedule that respects SLAs, such as RPOs.

One or more aspects of the disclosure recognize that a function that relates data protection characteristics with their time consumption may not be straightforward (due to many different characteristics such as auxiliary workloads (e.g., deduplication and fingerprinting), network conditions and concurrent workloads). In some embodiments, historical data is leveraged to learn such a function. However, the kinds of necessary information, and at which granularity, may also not be straightforward. Processing such historical data to generate insights in a timely manner may also be a concern. Finally, in at least some embodiments, a machine learning regression model provides a prediction of data protection time and the necessary information to have a sufficient confidence interval to come up with a robust plan.

Given a history of data protection requests, a set of information is identified that could be extracted from the historical data in order to have a reliable data protection time predictor.

In at least some embodiments, an automated data protection time prediction pipeline and associated techniques are disclosed. Initially, it is assumed in some embodiments that the disclosed data protection time prediction techniques are used by an infrastructure provider, that has access to multiple servers. This, however, does not limit the applicability of the disclosed data protection time prediction techniques, that may be employed in environments with only one data protection appliance, as would be apparent to a person of ordinary skill in the art.

In one or more embodiments, data is extracted from each data protection appliance separately (often making the training of machine learning algorithms more simplified, since some features are server-specific, such as model resources and allowable parallel streams). On the other hand, data from only one kind of server may not be sufficiently voluminous to generate an accurate model. Thus, one or more embodiments provide a mechanism to cluster similar servers.

FIG. 1 illustrates an exemplary data protection environment (also referred to herein as a computer network and/or an information processing system) 100, according to one embodiment of the disclosure. The exemplary data protection environment 100 comprises a data protection time predictor 110 that predicts a time to complete a data protection operation, in accordance with one or more embodiments, by one or more data protection appliances 130-1 through 130-N, collectively referred to herein as data protection appliances 130. Each data protection appliance 130 protects the data of one or more protected devices 120-1 . . . 120-M, collectively referred to herein as protected devices 120.

In the example of FIG. 1, the data protection time predictor 110, protected devices 120 and data protection appliance 130 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment.

In at least some embodiments, each protected device 120 comprises, for example, a user device, a server device, and/or one or more storage devices. In addition, each protected device 120 may be a physical device or a virtual device. In further variations, the protected devices 120 may comprise, for example, other devices such as mobile telephones, laptop computers, tablet computers, desktop computers or other types of computing devices. Such devices are examples of what are more generally referred to herein as "processing devices." Some of these processing devices are also generally referred to herein as "computers."

The protected devices 120 in some embodiments comprise respective processing devices associated with a particular company, organization or other enterprise or group of users. The protected devices 120 may be connected, at least in some embodiments, by an enterprise network. The enterprise network may comprise at least a portion of the computer network 100 of FIG. 1. Numerous other operating scenarios involving a wide variety of different types and arrangements of processing devices and networks are possible, as will be appreciated by those skilled in the art. The protected devices 120 may further comprise a network client (not shown in FIG. 1) that can include networking capabilities such as ethernet, Wi-Fi, etc.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, one or more of the data protection time predictor 110 and data protection appliance 130 can have one or more associated data protection appliance databases 140 configured to store data pertaining to one or more data protection appliance 130. As noted above, some embodiments of the present disclosure assume that the user of the disclosed data protection time prediction techniques is an infrastructure provider. As such, it is often natural to store data protection performance data in a centralized place. In other implementations, the data protection performance data may be separated by data protection appliance (e.g., where storage devices perform data protection operations and the data protection performance data is stored sequentially).

The database(s) 140 in the present embodiment is implemented using one or more storage systems associated with (or a part of and/or local to) the data protection time predictor 110 and/or one or more data protection appliances 130. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the data protection time predictor 110 can be one or more input-output devices, which illustratively comprise keyboards, displays or other types of input-output devices in any combination. Such input-output devices can be used, for example, to support one or more user interfaces to the data protection time predictor 110, as well as to support communication between the data protection time predictor 110 and one or more of the data protection appliances 130 and other related systems and devices not explicitly shown.

One or more of the data protection time predictor 110, the protected devices 120, and the data protection appliance 130 in the FIG. 1 embodiment are assumed to be implemented using at least one processing device. Each such processing device generally comprises at least one processor and an associated memory, and implements one or more functional modules for controlling certain features of the data protection time predictor 110, the protected devices 120, and/or the data protection appliance 130.

More particularly, one or more of the data protection time predictor 110, the protected devices 120, and the data protection appliance 130 in this embodiment each can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

A network interface (not shown) allows one or more of the data protection time predictor 110, the protected devices 120, and the data protection appliance 130 to communicate over the network 104 with each other (as well as one or more other networked devices), and illustratively comprises one or more conventional transceivers.

As also depicted in FIG. 1, the data protection time predictor 110 further comprises a performance feature evaluation engine 112, a data protection time prediction AI engine 114, and a dashboard interface 116. Generally, the exemplary performance feature evaluation engine 112 evaluates first level features, as discussed further below in conjunction with FIG. 4, and at least one second level feature that is evaluated using one or more of the first level features. In one or more embodiments, the exemplary data protection time prediction AI engine 114 implements the disclosed techniques for predicting a time to complete a data protection operation, as discussed further below in conjunction with FIGS. 3, 6 and 7, for example. In at least some embodiments, the data protection time prediction AI engine 114 comprises functionality for (i) training one or more machine learning models used in the prediction, (ii) performing model selection in a multi-model implementation, (iii) clustering data protection appliances 130, and (iv) for predicting a time to complete a data protection operation in real-time. The exemplary dashboard interface 116 allows a user to access an optional dashboard for evaluating predicted times to complete a data protection operation.

It is to be appreciated that this particular arrangement of modules 112, 114, and 116 illustrated in the data protection time predictor 110 of the FIG. 1 embodiment is presented by way of example only, and alternative arrangements can be used in other embodiments. For example, the functionality associated with modules 112, 114, and 116 in other embodiments can be combined into a single module, or separated across a larger number of modules. As another example, multiple distinct processors can be used to implement different ones of modules 112, 114, and 116 or portions thereof. At least portions of modules 112, 114, and 116 may be implemented at least in part in the form of software that is stored in memory and executed by a processor.

It is to be understood that the particular set of elements shown in FIG. 1 for predicting a time to complete a data protection operation involving protected devices 120 of computer network 100 is presented by way of illustrative example only, and in other embodiments additional or alternative elements may be used. Thus, another embodiment includes additional or alternative systems, devices and other network entities, as well as different arrangements of modules and other components.

Exemplary processes utilizing one or more of modules 112, 114, and 116 of exemplary data protection time predictor 110 in computer network 100 will be described in more detail with reference to the flow diagrams of FIGS. 3, 6 and 7.

Figure 2:
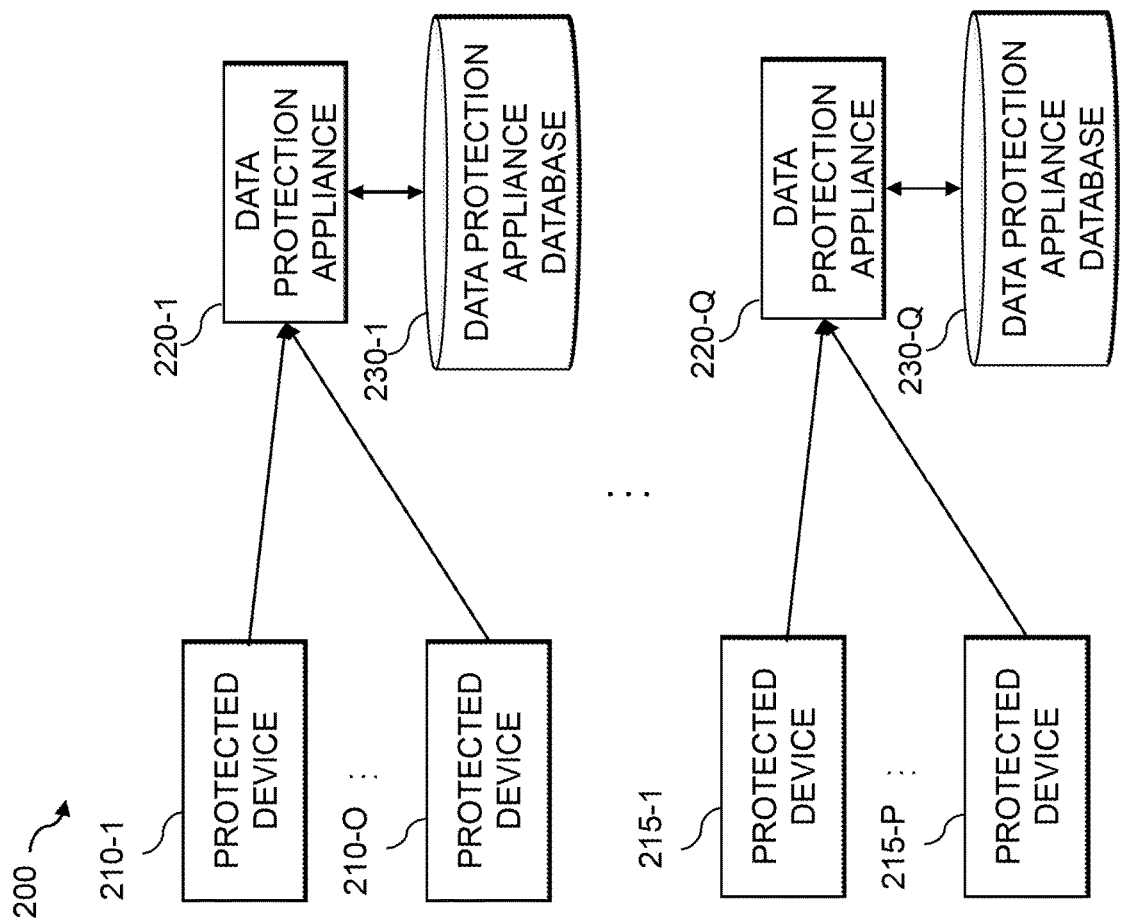
FIG. 2 illustrates an exemplary mapping of protected devices to a plurality of data protection appliances, according to an embodiment.

FIG. 2 illustrates an exemplary data protection storage environment 200, according to an embodiment of the disclosure. The exemplary data protection storage environment 200 comprises a many-to-one architecture in terms of protected devices 210-1 through 210-0 and protected devices 215-1 through 215-P and corresponding data protection appliances 220-1 through 220-Q, that may be found in enterprise environments. In the exemplary data protection storage environment 200 of FIG. 2, each data protection appliance 220-i has a corresponding dedicated data protection appliance database 230-i.

Figure 3:
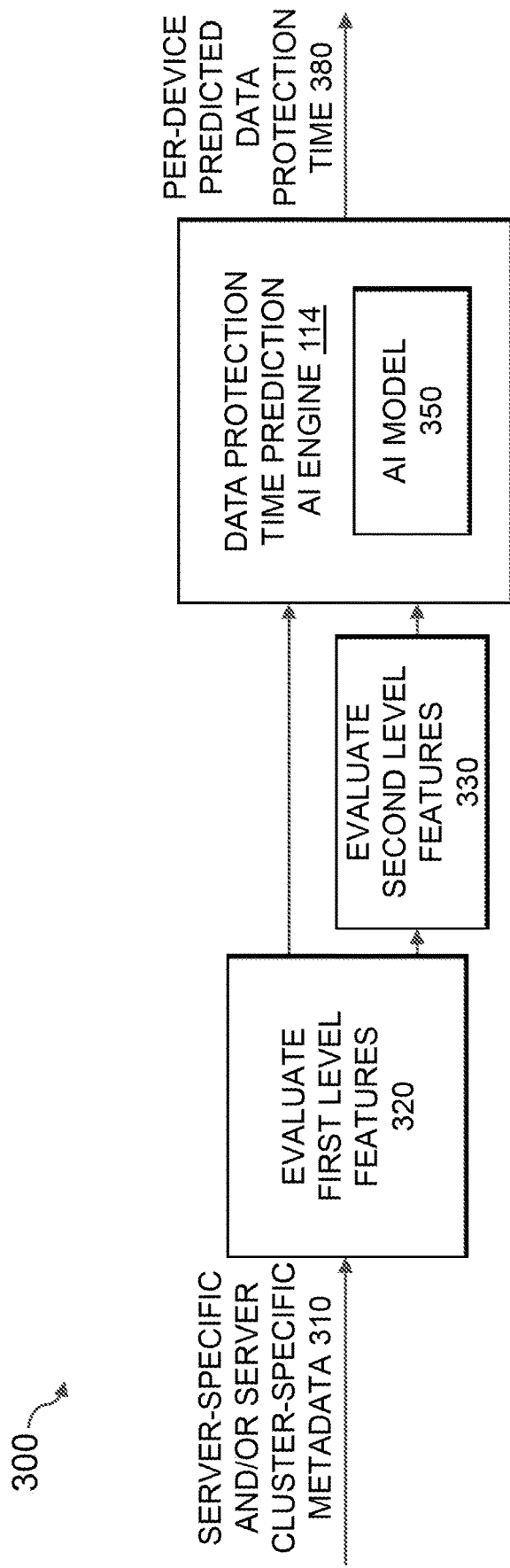
FIG. 3 is a flow chart illustrating a data protection time prediction process, according to some embodiments of the disclosure.

FIG. 3 is a flow chart illustrating a data protection time prediction process 300, according to some embodiments of the disclosure. In the example of FIG. 3, server-specific and/or server cluster-specific metadata 310 is processed to evaluate one or more first level features during step 320. One or more of the first level features are processed to evaluate one or more second level features during step 330.

As shown in FIG. 3, one or more of the first level features from step 320 and at least one second level feature from step 330 are applied to the data protection time prediction AI engine 114 of FIG. 1. The exemplary data protection time prediction AI engine 114 comprises an AI model 350, such as a machine learning model and/or a statistical model. Generally, the exemplary data protection time prediction AI engine 114 provides a predicted time 380 to complete a data protection operation with respect to data of a particular protected device associated with a given data protection appliance, as discussed further below.

It is noted that the raw historical data protection performance data logged by many data protection storage environments 100, 200 of FIG. 1 or 2, respectively, is not typically intended to be consumed by machine learning algorithms. One or more aspects of the disclosure recognize that important features that are often required to build an accurate prediction model might be missing or hidden in the raw historical data protection performance data. In practical terms, such databases may be characterized as not being machine learning-friendly.

In one or more embodiments, techniques are provided to generate features to be leveraged by a machine learning algorithm, for example, that aims to provide a completion time predictor for backup and restore operations in a data protection environment. In this manner, a more accurate machine learning model can be generated using a database with a relatively small amount of data.

FIG. 4 is a sample table 400 illustrating a number of exemplary first level features that are obtained from historical data protection performance data, according to some embodiments. As shown in FIG. 4, the table 400 identifies the exemplary features in field 410 logged by the data protection appliances 130 and a corresponding description is provided in field 420.

For example, the exemplary first level features in field 410 comprise a bytes scanned feature and a bytes sent feature, indicating a size of the data processed by a given data protection operation, before a deduplication operation, and a size of the data processed by the given data protection operation after the deduplication operation, respectively.

In at least some embodiments, the disclosed data protection time predictor 110 processes the first level data features in the table 400 of FIG. 4 to generate additional features that impact the completion time of the data protection operations. Consider a data protection environment with client-side deduplication (at each protected device) that receives fingerprints from a data protection appliance 130 and a client decides what data to send to the data protection appliances 130 and what data is already available to the data protection appliances 130.

In one or more embodiments, two additional features, often referred to herein as second level features, are derived from the first level features listed in the table 400 of FIG. 4: (i) the previous observed speeds in terms of bytes sent per second, and (ii) the amount of duplicates from a number of total bytes in that protected device 120 (based on historical performance data) (e.g., for sequential data protections when previously protected data is already on the data protection appliance 130). In one possible embodiment, both speed and deduplication ratio calculations are shown below as second level features:

$$\text{Speed} = \frac{\text{elapsed time}}{\text{bytes sent}}; \text{and}$$

$$\text{Deduplication Ratio} = \frac{\text{bytes sent}}{\text{bytes scanned}},$$

where the elapsed time, bytes sent and bytes scanned are first level features defined in FIG. 4.

In addition, it may be important to know how concurrency affects the data protection completion times. Thus, at least in some embodiments, the concurrency is evaluated as another second level feature. Each data protection appliance 130 is assumed to handle a maximum number of streams, but even when this limit is not reached, concurrency may affect data protection operation times due to context switching. Thus, some processing needs to be performed across past data protection operations. It is necessary to know, in at least some embodiments, at each time unit, how many concurrent operations are running in a given data protection appliance 130. Thereafter, a time window between the start time and the finish time (e.g., the elapsed time) is run for each data protection operation, and an aggregation of the number of concurrent operations is taken.

FIG. 5 illustrates exemplary tables 500, 550 for computing a number of concurrent data protection operations, according to at least one embodiment of the disclosure. As shown in FIG. 5, an exemplary data protection table 500 identifying backup and restore events happening at each time period 510 (e.g., time periods 1-7) for a given data protection appliance 130 that serves four protected devices 120, and an exemplary aggregation table 550 indicating an aggregation of the number of concurrent operations 560 for each time period 510. It is noted that such aggregations can be performed with multiple different functions and an average is just one exemplary possibility, as would be apparent to a person of ordinary skill in the art.

For the exemplary data of FIG. 5, an aggregation (e.g., using an exemplary mean) of the concurrent operations 560 for a given backup or restore event can be expressed as 1.5 (e.g., an average of two concurrent operations 560 and one concurrent operation 560 for time periods 510-4 and 510-5, respectively).

The first level data from the exemplary table 400 of FIG. 4, together with the two additional second level features derived therefrom, are used to train a machine learning model that predicts the operation times of backup and restore events. In some embodiments, the performance metric data and the two additional second level features are divided into training data, validation data and test data and a regression learning model (such as a Linear Regression or Regression Trees) is used to train the model. The maximum complexity of the employed machine learning models will vary depending on the availability of data. Generally, in at least some embodiments, the suggested amount of data needs to be at least 10 times greater than the number of parameters (e.g., in order to train a generalizable model). If the amount of data is not sufficient, a simpler model may be used in some embodiments.

After training some machine learning models, a comparison is made on a validation dataset to evaluate error and/or loss functions. As discussed further below, a family of error functions is employed in some embodiments that has an interpretation of standard deviation, or a percentage of the mean that is the standard deviation. This family includes, for example, error metrics such as Root Mean Squared Error (RMSE), Mean Absolute Error (MAE) and Mean Absolute Percentage Error (MAPE). In at least one embodiment, the MAPE metric is employed as it weights the true value in the following equation. The MAPE can be calculated as follows:

$$MAPE = \frac{1}{\|\mathcal{D}\|} \sum_{i=0}^{\|\mathcal{D}\|} \frac{|\text{predicted } value_i - \text{true } value_i|}{\text{true } value_i},$$

where $\|\mathcal{D}\|$ is the size of the dataset.

If one or more data protection appliances 130 do not have sufficient historical data to train the employed machine learning models (or are new data protection appliances without available training data), data from one or more similar data protection appliances 130 can be employed (e.g., based on one or more predefined similarity criteria). For example, the exemplary data protection appliances 130 can be clustered using the same features discussed above, if present, and some features that are not inside the data of the table 400 of FIG. 4, but rather on the specifications of each data protection appliance 130, such as product model and allowable number of concurrent jobs. This serves as input for clustering algorithms such as a k-means clustering algorithm. One or more aspects of the disclosure recognize that for such unsupervised steps, there is no need to separate the datasets.

After clustering is complete, the regression learning pipeline can be re-executed using data from a single data protection appliance 130 and/or data from a cluster of similar data protection appliances 130. If the trained model using the data of several data protection appliances 130 has superior performance in terms of the error metrics described above, the model trained using the cluster data is used rather than the previously trained model.

In one or more embodiments, when a new data protection appliance 130 needs to run the regression learning pipeline but does not have sufficient training data, the new data protection appliance 130 takes a regression model from the nearest neighbor in the clustering features dimension subspace or uses the model from a cluster where the new data protection appliance 130 was assigned.

After a trained machine learning model is selected for a data protection appliance 130 (e.g., with clustering or just training of a standalone model), at inference time, the model will be used to provide not only estimates of the data protection operation time but also a tolerance or slack (for example, providing conservative protection) to make upstream decisions less prone to the variability that naturally occurs due to several unfactored causes.

One or more embodiments employ a hyperparameter of robustness y that can be cluster or server specific, to augment the prediction by using the following expression:

RobustPredTime=(1+γ·MAPE)PredTime.

In this manner, if upstream decisions, such as scheduling, are performed after the data protection operation time prediction pipeline, the predicted time will not be the expected time but rather an upper bound of the time with a probability p, that directly depends on γ. If it is assumed that the model errors are distributed normally (which is reasonable for unbiased models), γ can be derived for a given p, as follows:

$$\gamma = \text{erf}\left(\frac{p}{2}\right),$$

where erf is the error function, referenced above.

Figure 6:
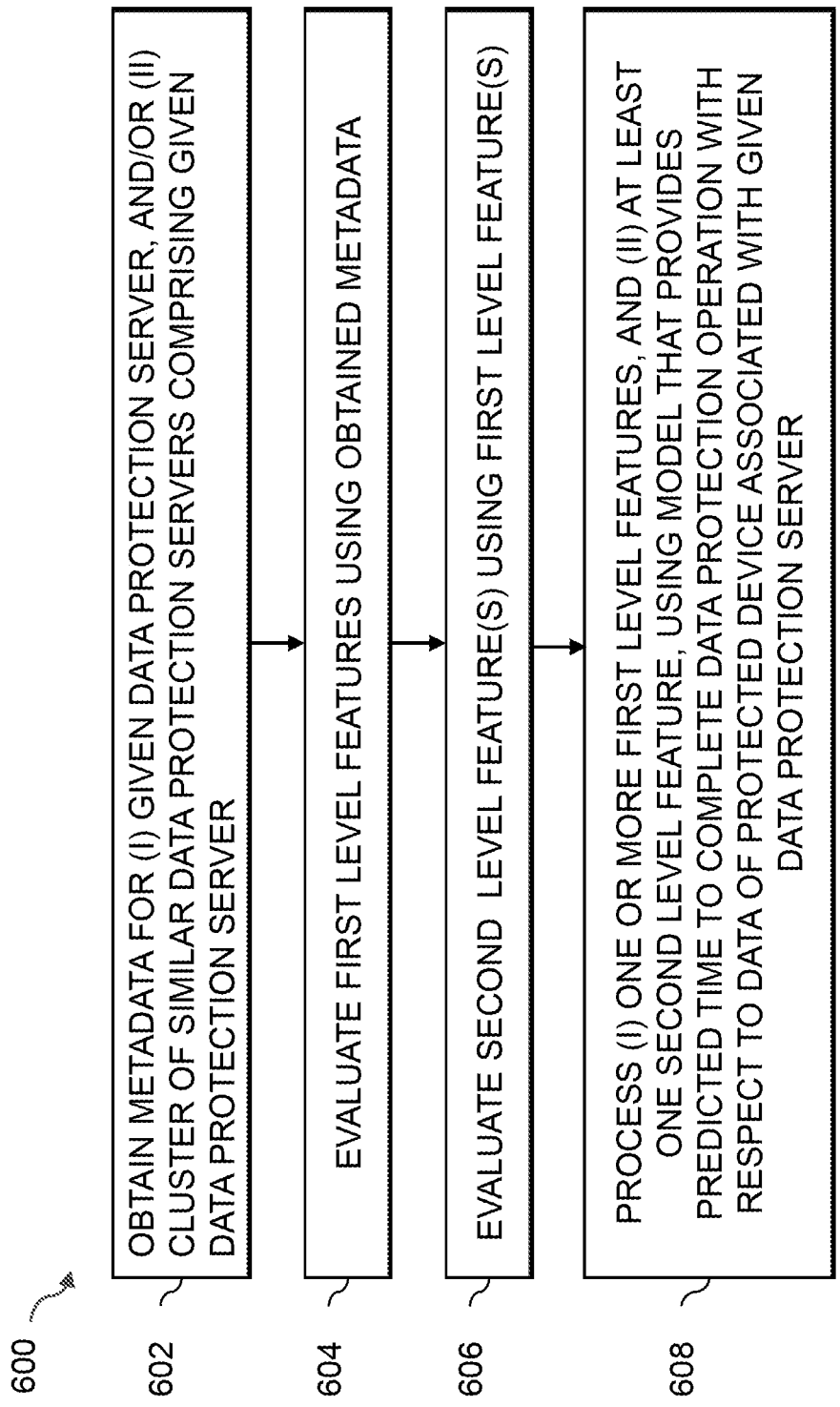
FIG. 6 is a flow chart illustrating a data protection time prediction process, according to an embodiment.

FIG. 6 is a flow chart illustrating a data protection time prediction process 600, according to an embodiment. As shown in FIG. 6, the exemplary data protection time prediction process 600 initially obtains metadata during step 602 for at least one of: (i) a given data protection appliance 130, and (ii) a cluster of similar data protection appliances 130 comprising the given data protection appliance 130, based at least in part on one or more similarity criteria. During step 604, the data protection time prediction process 600 evaluates a plurality of first level features (FIG. 4) using the obtained metadata, and during step 606 at least one second level feature is evaluated using at least some of the evaluated first level features.

Finally, during step 608 the data protection time prediction process 600 processes (i) one or more of the first level features, and (ii) the at least one second level feature, using at least one model that provides a predicted time to complete a data protection operation with respect to data of a protected device associated with the given data protection appliance.

Figure 7:
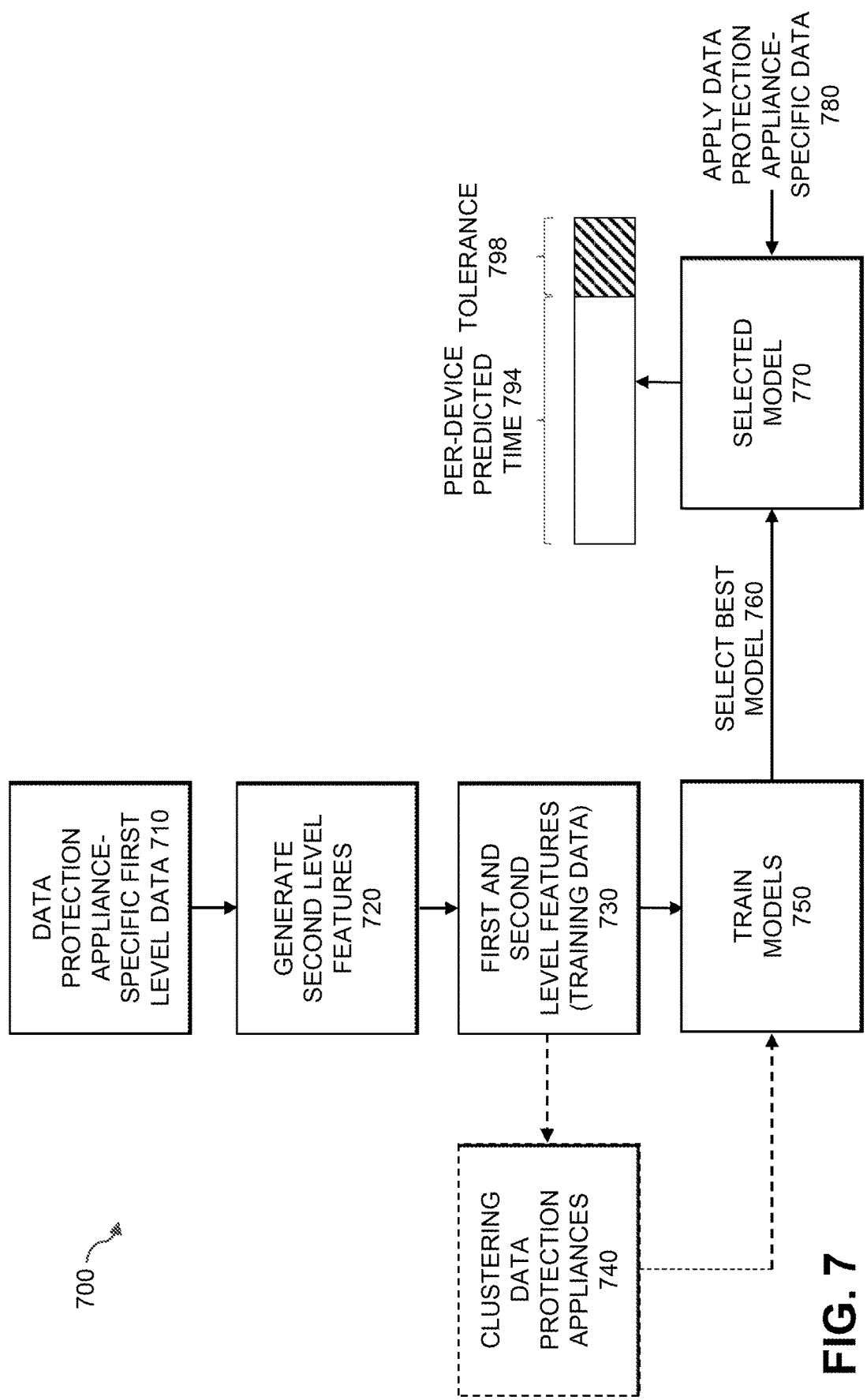
FIG. 7 is a flow chart illustrating a data protection time prediction process, according to some embodiments of the disclosure.

FIG. 7 is a flow chart illustrating a data protection time prediction process 700, according to some embodiments of the disclosure. As shown in FIG. 7, the exemplary data protection time prediction process 700 initially collects data protection appliance-specific first level data (e.g., from FIG. 4) during step 710, if available, and then generates second level features during step 720 from the first level features.

The first level features and the second level features are processed during step 730 to prepare a set of training data to train one or more machine learning models during step 750. During step 740, the exemplary data protection time prediction process 700 optionally clusters a plurality of data protection appliances 130 and the first level features and second level features of the cluster to which a given data protection appliance 130 is assigned can be used as the training data in addition to, and/or instead of the first level features and second level features of the given data protection appliance 130 itself. Such references herein to optional steps or elements should not be construed to suggest that other steps or elements are required in other embodiments.

When a plurality of machine learning models is trained during step 750, a best model is selected during step 760, using the techniques described above, to perform the disclosed data protection operation time prediction during step 770 with real-time data protection appliance-specific data 780. As shown in FIG. 7, at least in some embodiments, the generated data protection operation time prediction comprises an actual predict time 794 for a given protected device 120, as well as the tolerance (or slack) 798 described above, expressed as follows:

$$PredTime=ModelPred(data)\cdot(1+\gamma\cdot MAPE)$$

The particular processing operations and other network functionality described in conjunction with the flow diagrams of FIGS. 3, 6 and 7 are presented by way of illustrative example only, and should not be construed as limiting the scope of the disclosure in any way. Alternative embodiments can use other types of processing operations to predict a time to complete a data protection operation. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

In one or more embodiments, a structured pipeline is provided to predict data protection times using historical data. In some embodiments, a model error metric is used as a proxy to the standard deviation of the real-world process to provide a tolerance or slack for the actual predicted value. In this manner, a sensitivity analysis and robustness are provided down the pipeline.

In at least some embodiments of the disclosure, the disclosed data protection operation time prediction pipeline leverages historical data and uses the historical data to train one or more machine learning models. One or more error metrics are optionally used to (i) devise more robust decisions down the pipeline, and (ii) trigger retraining when the current error of inference starts becomes sufficiently greater than the one observed at validation time based on one or more predefined metrics.

In one exemplary implementation, three different kinds of machine learning models were employed: a linear regression; a random forest regression using a forest of 100 trees with a maximum depth of 10 sub-nodes and two nearest neighbors. The evaluation of results was performed using two metrics, $R^2$ and MAPE, where $R^2$ is a measurement of the portion of the variance of the real data captured by the machine learning model. MAPE, on the other hand, is a relative deviation from the true value, as shown previously.

One or more embodiments of the disclosure provide improved methods, apparatus and computer program products for predicting a time to complete a data protection operation. The foregoing applications and associated embodiments should be considered as illustrative only, and numerous other embodiments can be configured using the techniques disclosed herein, in a wide variety of different applications.

It should also be understood that the disclosed data protection operation time prediction techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for predicting a time to complete a data protection operation may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as data protection time predictor 110, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based data protection operation time prediction platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 8 and 9. These platforms may also be used to implement at least portions of other information processing systems in other embodiments.

Figure 8:
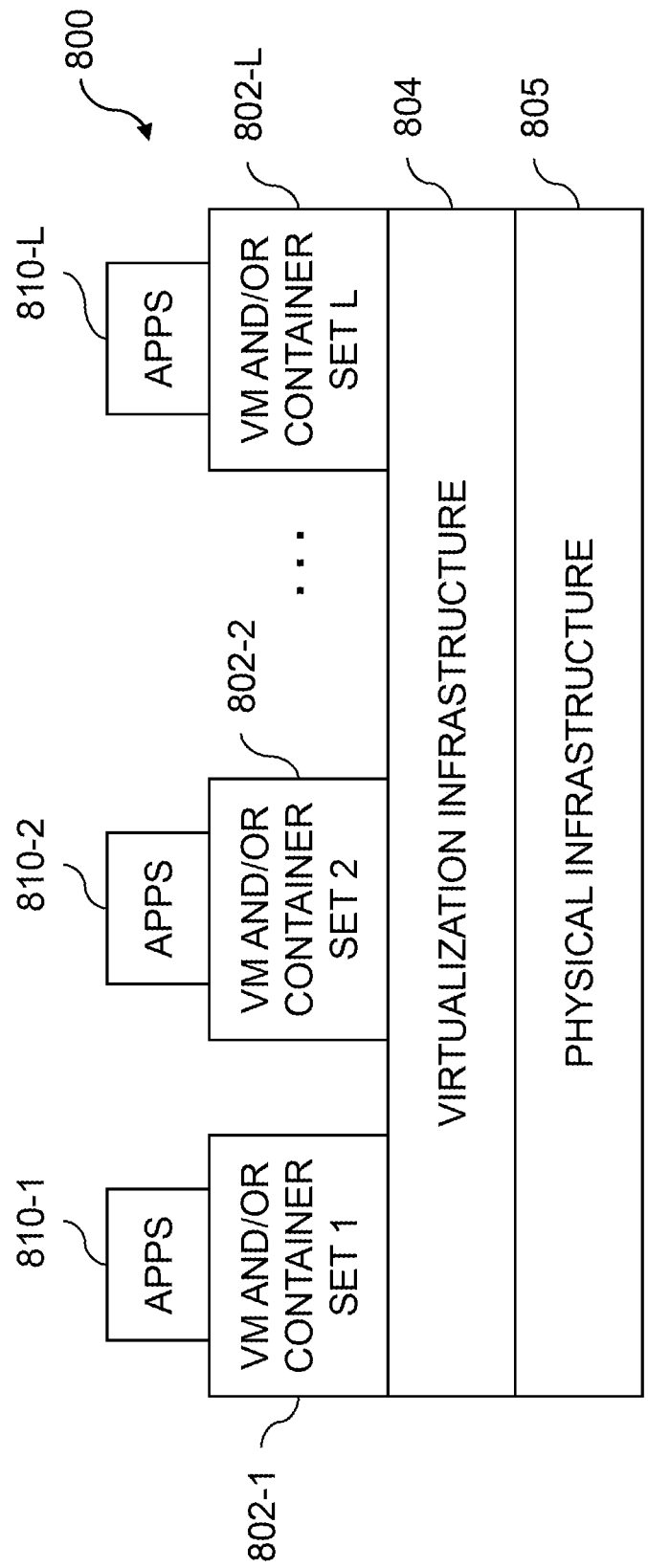
FIG. 8 illustrates an exemplary processing platform that may be used to implement at least a portion of one or more embodiments of the disclosure comprising a cloud infrastructure.

FIG. 8 shows an example processing platform comprising cloud infrastructure 800. The cloud infrastructure 800 comprises a combination of physical and virtual processing resources that may be utilized to implement at least a portion of the information processing system 100. The cloud infrastructure 800 comprises multiple virtual machines (VMs) and/or container sets 802-1, 802-2, . . . 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system.

The cloud infrastructure 800 further comprises sets of applications 810-1, 810-2, . . . 810-L running on respective ones of the VMs/container sets 802-1, 802-2, . . . 802-L under the control of the virtualization infrastructure 804. The VMs/container sets 802 may comprise respective VMs, respective sets of one or more containers, or respective sets of one or more containers running in VMs.

In some implementations of the FIG. 8 embodiment, the VMs/container sets 802 comprise respective VMs implemented using virtualization infrastructure 804 that comprises at least one hypervisor. Such implementations can provide data protection operation time prediction functionality of the type described above for one or more processes running on a given one of the VMs. For example, each of the VMs can implement data protection operation time prediction control logic and associated machine learning model training and selection functions for providing data protection operation time prediction functionality for one or more processes running on that particular VM.

An example of a hypervisor platform that may be used to implement a hypervisor within the virtualization infrastructure 804 is the VMware® vSphere® which may have an associated virtual infrastructure management system such as the VMware® vCenter™. The underlying physical machines may comprise one or more distributed processing platforms that include one or more storage systems.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system. Such implementations can provide data protection operation time prediction functionality of the type described above for one or more processes running on different ones of the containers. For example, a container host device supporting multiple containers of one or more container sets can implement one or more instances of data protection operation time prediction control logic and associated machine learning model training and selection functions for use in generating data protection operation time predictions.

As is apparent from the above, one or more of the processing modules or other components of system 100 may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises at least a portion of the given system and includes a plurality of processing devices, denoted 902-1, 902-2, 902-3, . . . 902-K, which communicate with one another over a network 904. The network 904 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 902-1 in the processing platform 900 comprises a processor 910 coupled to a memory 912. The processor 910 may comprise a microprocessor, a microcontroller, an application specific integrated circuit (ASIC), a field programmable gate array (FPGA) or other type of processing circuitry, as well as portions or combinations of such circuitry elements, and the memory 912, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and the given system may include additional or alternative processing platforms, as well as numerous distinct processing platforms in any combination, with each such platform comprising one or more computers, storage devices or other processing devices.

Figure 9:
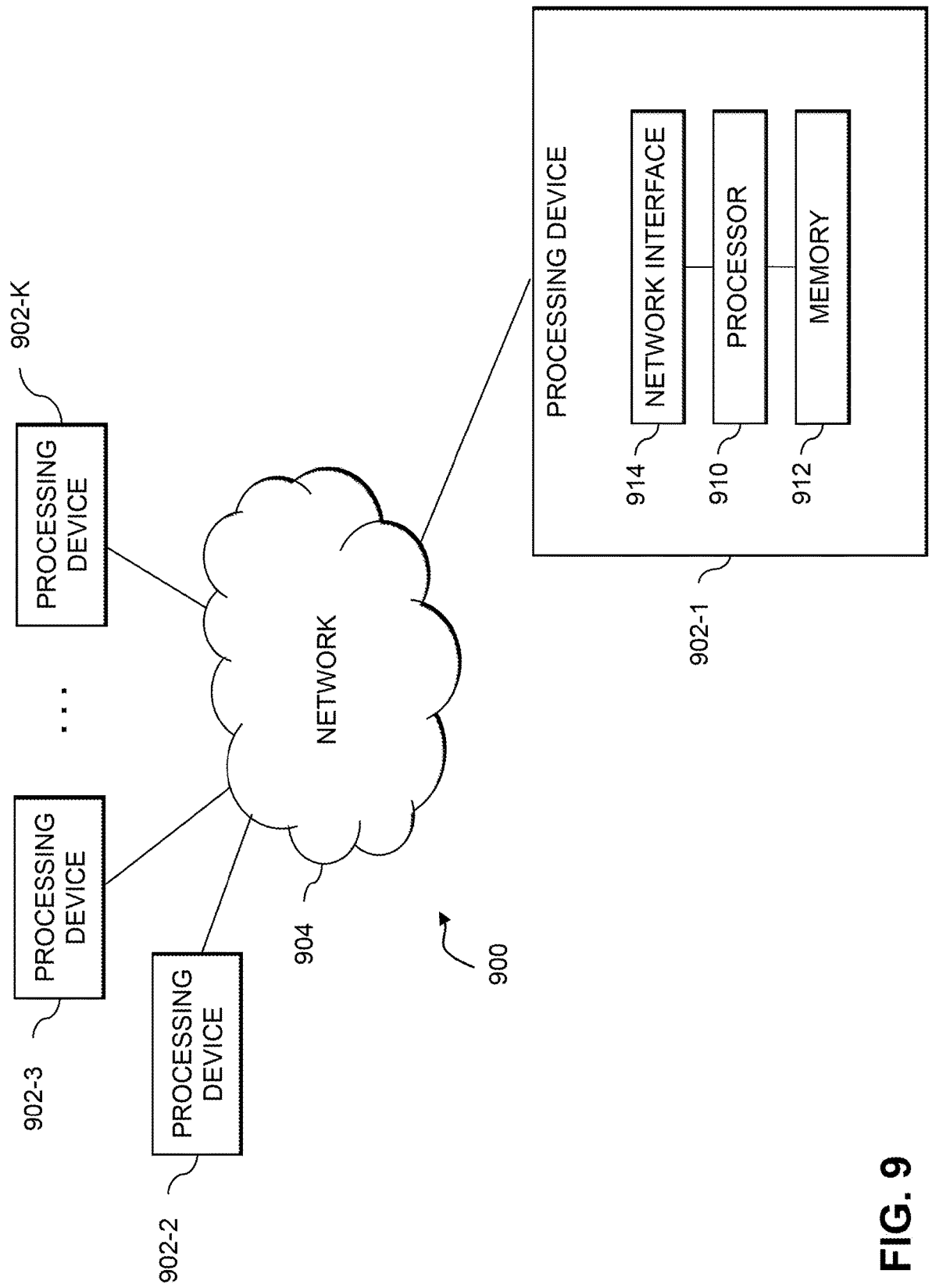
FIG. 9 illustrates another exemplary processing platform that may be used to implement at least a portion of one or more embodiments of the disclosure.

Multiple elements of an information processing system may be collectively implemented on a common processing platform of the type shown in FIG. 8 or 9, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
obtaining metadata for at least one of: (i) a given data protection appliance, and (ii) a cluster of similar data protection appliances comprising the given data protection appliance, based at least in part on one or more similarity criteria;
evaluating a plurality of first level features using the obtained metadata;
evaluating at least one second level feature using at least some of the evaluated first level features; and
processing (i) one or more of the first level features, and (ii) the at least one second level feature, using at least one model that provides a predicted time to complete a data protection operation with respect to data of a protected device associated with the given data protection appliance;
wherein the method is performed by at least one processing device comprising a processor coupled to a memory.

2. The method of claim 1, wherein the at least one second level feature comprises one or more of a previous data protection speed feature and a deduplication ratio feature for the protected device associated with the given data protection appliance.

3. The method of claim 2, wherein the previous data protection speed feature is based at least in part on an elapsed time and an amount of data protected in one or more prior data protection operations for the protected device associated with the given data protection appliance.

4. The method of claim 2, wherein the deduplication ratio feature is based at least in part on an amount of data protected in one or more prior data protection operations after a deduplication operation relative to an amount of data included in the one or more prior data protection operations before the deduplication operation for the protected device associated with the given data protection appliance.

5. The method of claim 1, wherein the at least one model comprises one or more of at least one machine learning model and at least one statistical model.

6. The method of claim 1, wherein the protected device comprises one or more of a user device, a server device, and one or more storage devices.

7. The method of claim 1, wherein the predicted time to complete the data protection operation comprises a tolerance based at least in part on a robustness factor.

8. The method of claim 1, wherein the at least one model comprises a plurality of models, and wherein a particular model is selected using one or more of at least one error function and at least one loss function that approximates a standard deviation of the predicted time.

9. The method of claim 1, wherein the predicted time to complete the data protection operation is based at least in part on a number of protected devices associated with the given data protection appliance that are concurrently undergoing a data protection operation with the protected device for one or more time intervals.

10. An apparatus comprising:
at least one processing device comprising a processor coupled to a memory;
the at least one processing device being configured to implement the following steps:
obtaining metadata for at least one of: (i) a given data protection appliance, and (ii) a cluster of similar data protection appliances comprising the given data protection appliance, based at least in part on one or more similarity criteria;
evaluating a plurality of first level features using the obtained metadata;
evaluating at least one second level feature using at least some of the evaluated first level features; and
processing (i) one or more of the first level features, and (ii) the at least one second level feature, using at least one model that provides a predicted time to complete a data protection operation with respect to data of a protected device associated with the given data protection appliance.

11. The apparatus of claim 10, wherein the at least one second level feature comprises one or more of: (i) a previous data protection speed feature based at least in part on an elapsed time and an amount of data protected in one or more prior data protection operations for the protected device associated with the given data protection appliance; and (ii) a deduplication ratio feature based at least in part on an amount of data protected in one or more prior data protection operations after a deduplication operation relative to an amount of data included in the one or more prior data protection operations before the deduplication operation for the protected device associated with the given data protection appliance.

12. The apparatus of claim 10, wherein the at least one model comprises one or more of at least one machine learning model and at least one statistical model.

13. The apparatus of claim 10, wherein the predicted time to complete the data protection operation comprises a tolerance based at least in part on a robustness factor.

14. The apparatus of claim 10, wherein the at least one model comprises a plurality of models, and wherein a particular model is selected using one or more of at least one error function and at least one loss function that approximates a standard deviation of the predicted time.

15. The apparatus of claim 10, wherein the predicted time to complete the data protection operation is based at least in part on a number of protected devices associated with the given data protection appliance that are concurrently undergoing a data protection operation with the protected device for one or more time intervals.

16. A non-transitory processor-readable storage medium having stored therein program code of one or more software programs, wherein the program code when executed by at least one processing device causes the at least one processing device to perform the following steps:
obtaining metadata for at least one of: (i) a given data protection appliance, and (ii) a cluster of similar data protection appliances comprising the given data protection appliance, based at least in part on one or more similarity criteria;
evaluating a plurality of first level features using the obtained metadata;
evaluating at least one second level feature using at least some of the evaluated first level features; and
processing (i) one or more of the first level features, and (ii) the at least one second level feature, using at least one model that provides a predicted time to complete a data protection operation with respect to data of a protected device associated with the given data protection appliance.

17. The non-transitory processor-readable storage medium of claim 16, wherein the at least one second level feature comprises one or more of: (i) a previous data protection speed feature based at least in part on an elapsed time and an amount of data protected in one or more prior data protection operations for the protected device associated with the given data protection appliance; and (ii) a deduplication ratio feature based at least in part on an amount of data protected in one or more prior data protection operations after a deduplication operation relative to an amount of data included in the one or more prior data protection operations before the deduplication operation for the protected device associated with the given data protection appliance.

18. The non-transitory processor-readable storage medium of claim 16, wherein the predicted time to complete the data protection operation comprises a tolerance based at least in part on a robustness factor.

19. The non-transitory processor-readable storage medium of claim 16, wherein the at least one model comprises a plurality of models, and wherein a particular model is selected using one or more of at least one error function and at least one loss function that approximates a standard deviation of the predicted time.

20. The non-transitory processor-readable storage medium of claim 16, wherein the predicted time to complete the data protection operation is based at least in part on a number of protected devices associated with the given data protection appliance that are concurrently undergoing a data protection operation with the protected device for one or more time intervals.

* * * * *